3,470,190
10 - [(N-LOWER ALKYL-PYRROLIDYL)-METHYL-
IDENE] AND 10 - (N - LOWER ALKYL-PIPER-
IDYLIDENE) DERIVATIVES OF 9,10-DIHYDRO-
9-ANTHROL
Klaus Reinhold Noll, Alex Berg, Hans Machleidt, Werner
Roethele, and Günther Engelhardt, Biberach an der
Riss, Germany, assignors to Boehringer Ingelheim
G.m.b.H., Ingelheim am Rhein, Germany, a corporation of Germany
No Drawing. Filed Nov. 9, 1966, Ser. No. 592,973
Claims priority, application Germany, Nov. 15, 1965,
T 29,792
Int. Cl. C07d 29/12, 27/24; A61k 27/00
U.S. Cl. 260—294.7
6 Claims

ABSTRACT OF THE DISCLOSURE

The compounds are derivatives of 9,10-dihydro-9-anthrol of the formula

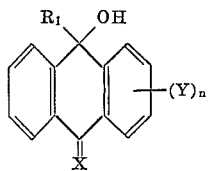

wherein $R_1$ is hydrogen, lower alkyl or phenyl,
X is (N-lower alkyl-pyrrolidyl)methylidene or N-lower alkyl-piperidylidene,
Y is methyl, chlorine, bromine or methoxy, and
$n$ is an integer from 0 to 2, inclusive, and non-toxic acid addition salts thereof, useful as sedatives and antitoxins against snake poison in warm-blooded animals.

---

This invention relates to novel derivatives of 9,10-dihydro-9-anthrol, acid addition salts thereof and quaternary ammonium salts thereof, as well as to various methods of preparing these compounds.

More particularly, the present invention relates to novel compounds of the formula

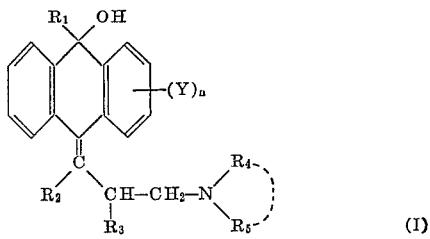

wherein $R_1$ is hydrogen, lower alkyl, aralkyl or aryl, where the aromatic moiety of said aralkyl and aryl may have a halogen, lower alkyl or lower alkoxy substituent attached thereto,
$R_2$, $R_3$ and $R_4$, which may be identical to or different from each other, are each hydrogen or lower alkyl,
$R_5$ is lower alkyl,
$R_2$ and $R_4$, together with each other and the nitrogen atom to which $R_4$ is attached and the carbon chain linking the nitrogen atom to the anthrol nucleus, form a 5- to 7-membered saturated heterocycle which may be interrupted by another heteroatom and/or may have one or more lower alkyl substituents attached thereto,
$R_3$ and $R_5$, together with each other and the nitrogen atom to which $R_5$ is attached and the carbon chain linking the nitrogen atom to $R_3$, form a 5- to 7-membered saturated heterocycle which may be interrupted by another heteroatom and/or may have one or more lower alkyl substituents attached thereto,
$R_4$ and $R_5$, together with each other and the nitrogen atom to which they are attached, form a 5- to 7-membered saturated heterocycle which may be interrupted by another heteroatom and/or may have one or more lower alkyl substituents attached thereto,
Y is hydrogen, halogen, methyl or methoxy, and $n$ is an integer from 1 to 2, inclusive, non-toxic, pharmacologically acceptable acid addition salts thereof, and quaternary ammonium salts thereof.

The compounds according to the present invention may be prepared by either of the following methods:

Method A.—For the preparation of a compound of the Formula I wherein $R_1$ is hydrogen, by reducing an anthranone derivative of the formula

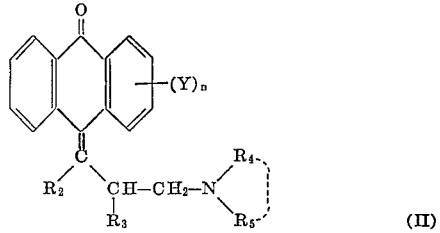

wherein $R_2$, $R_3$, $R_4$, $R_5$, Y and $n$ have the same meaning as in Formula I.

The reduction is preferably carried out with the aid of a complex metal hydride reducing agent, such as lithium aluminum hydride, in the presence of an inert organic solvent, such as dioxane, dibutylether or tetrahydrofuran; or with the aid of sodium borohydride or diborane in the presence of a solvent, such as ethanol, ethanol-water mixtures or tetrahydrofuran. The reduction reaction with these reducing agents is carried out at a temperature between 0 and 100° C. Thereafter, the reaction mixture is decomposed with water, and the reaction product is extracted from the aqueous mixture with the aid of a suitable organic solvent, such as an ester, and then purified by recrystallization.

The reduction may, however, also be effected by means of the Meerwein-Ponndorf-Verley Reduction (see the Merck Index, Seventh Edition, page 1449) with isopropanol in the presence of aluminum isopropylate, where the excess isopropanol may simultaneously serve as the solvent medium. The reduction reaction is advantageously carried out at the boiling point of the carbonyl compound formed by the reaction while continuously distilling the carbonyl compound out of the reaction mixture. The reaction mixture is then worked up as described in the preceding paragraph.

Method B.—For the preparation of a compound of the Formula I wherein $R_1$ has the indicated meanings except hydrogen, by reacting an anthrone derivative of the Formula II above with a compound of the formula $$R_1\text{—Z} \qquad (\text{III})$$

wherein $R_1$ has the same meanings as in Formula I except hydrogen and Z is an alkali metal, such as lithium, or halomagnesium.

The reaction is carried out in the presence of an inert, anhydrous organic solvent, such as tetrahydrofuran or dioxane, at a temperature between 0° C. and the boiling point of the particular solvent which is employed. After completion of the reaction, the reaction mixture is decomposed with water and worked up as described under Method A.

When a compound of the Formula II wherein Y has the indicated meanings except hydrogen and wherein $n=1$ is used as the starting material, the exact position of this residue could not be determined. Consequently, the exact position of this residue in compounds of Formula I could also not be determined until now. On the other hand, when $n=2$ in the starting compound, a mixture of two di-substituted position isomers will be obtained as the end product if the two Y-substituents are in the 1- and 3-positions or 2- and 4-positions of the benzo-ring. Such mixtures of position isomers may be separated into their pure isomeric components by customary methods, especially by column-chromatography.

The compounds of the Formula II above, which are used as starting materials in methods A and B, may themselves be prepared by well known methods; for instance, by reacting an anthraquinone compound of the formula

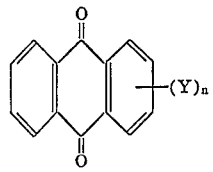

wherein Y and $n$ have the same meanings as in Formula I, with an aminoalkyl-metal compound of the formula

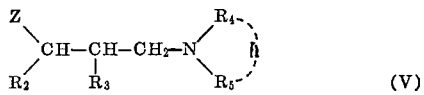

wherein $R_2$, $R_3$, $R_4$ and $R_5$ have the same meanings as in Formula I and Z is an alkali metal, such as lithium, or halomagnesium, and thereafter converting the intermediate oxanthrone compound of the formula

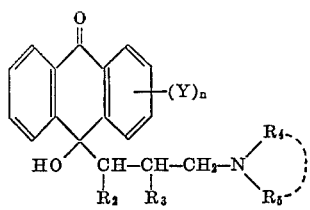

formed thereby, wherein $R_2$–$R_5$, Y and $n$ have the same meanings as in Formula I, into the corresponding anthrone derivative of the Formula II by dehydration with a customary dehydrating agent, such as sulfuric acid, polyphosphoric acid, methanolic hydrochloric acid, phosphorus pentoxide, zinc chloride or iodine.

Using the above procedure, the following starting compounds of the Formula II were prepared:

(a) 10-(3-dimethylamino-propylidene)-anthrone; M.P. of picrate 168–170° C.
(b) 10 - [3 - (1 - methyl - 4 - piperazino) - propylidene] - anthrone; M.P. 111° C.
(c) 2 (or 3)-chloro - 10 - (1 - methyl - 4 - piperidylidene)- anthrone; M.P. of picrate 231° C.
(d) 2 (or 3)-chloro-10-(3-dimethylamino-propylidene)-anthrone; thin-film chromatographic $R_f=0.5$ (silicagel, acetone/ammonia=98:2).
(e) 2,3 - dichloro - 10 - (3 - dimethylamino-propylidene)-anthrone; M.P. of picrate 210° C.
(f) 10 - [(1 - methyl -3 - pyrrolidino) - methylidene] - anthrone; M.P. 137° C.
(g) 10 - [3 - (1 - dimethylamino) - butylidene]-anthrone; M.P. of picrate 194° C.

The end products of the Formula I obtained by methods A and B are organic nitrogen bases and will therefore form acid addition salts with inorganic or organic acids, as well as quaternary ammonium salts with various quaternizing agents. Examples of non-toxic, pharmacologically acceptable acid addition salts include, but are not limited to, those formed with hydrochloric acid, sulfuric acid, phosphoric acid, citric acid, maleic acid, fumaric acid, tartaric acid, 8-chlorotheopylline and the like. Examples of non-toxic, pharmacologically acceptable quaternary ammonium are those formed with an alkyl halide, an aralkyl halide or a dialkyl sulfate.

The following examples further illustrate the present invention and will enable others skilled in the art to understand the invention more completely. It should be understood, however, that the instant invention is not limited to the particular examples given below.

Example A.—Preparation of starting compound 10-(1-methyl-4-piperidylidene)-anthrone 56 gm. (0.18 mol) of 10-(1-methyl-4-piperidyl)-oxanthrone were dissolved in 250 cc. of concentrated sulfuric acid, and the solution was heated for two minutes at 100° C. and then cooled. The reddish-brown solution was decomposed with ice, filtered through charcoal, and made alkaline with concentrated ammonia. The light brown precipitate formed thereby was collected by vacuum filtration, washed with water, dried and recrystallized from ethylacetate. 38 gm. (0.13 mol or 73% of theory) of 10-(1-methyl-4-piperidylidane)-anthrone, M.P. 171–172° C., of the formula

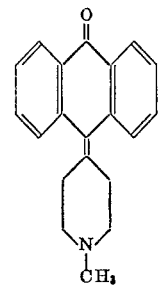

were obtained.

Example B.—Preparation of starting compound 10-(3-dimethylamino-propylidene)-anthrone 10 gm. (0.034 mol) of 10-(3-dimethylamino-propyl)-oxanthrone, M.P. 148–150° C., were dissolved in 80 cc. of polyphosphoric acid comprising 50 parts by weight of phosphorus pentoxide per 100 parts by weight of orthophosphoric acid. The resulting solution was heated for two minutes at 100° C. and then cooled, decomposed with ice, filtered through charcoal and made alkaline with concentrated ammonia. The precipitate formed thereby was collected by vacuum filtration, washed with water and dried. A virtually quantitative yield of raw 10-(3-dimethylaminopropylidene)-anthrone of the formula

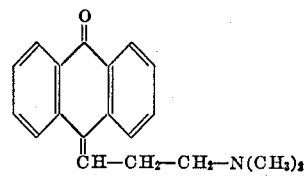

was obtained. This raw product did not need to be purified prior to its use in Example 2 below.

Example 1.—Preparation of 9,10-dihydro-10-(1-methyl-4-piperidylidene)-9-anthrol by Method A 19.6 gm. (0.068 mol) of 10-(1-methyl-4-piperidylidene)-anthrone were dissolved in 150 cc. of tetrahydrofuran, and the solution was added at a slow dropwise rate to a suspension of 1.3 gm. (0.034 mol) of lithium aluminum hydride in tetrahydrofuran at 40° C. while stirring. After all of the anthrone solution had been added, the reaction mixture was boiled for several hours, then cooled and poured over ice. The insoluble matter was filtered off, the filter cake was extracted several times with chloroform, the extract solutions were combined with the filtrate, and the mixed solution was dried and evaporated. The residue was recrystallized from ethylacetate, yielding 17.7 gm. (0.061 mol or 90% of theory) of 9,10-dihydro- 10-(1-methyl-4-piperidylidene)-9-anthrol, M.P. 227–228° C., of the formula

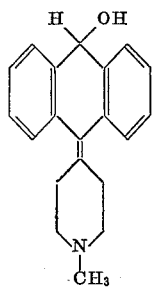

Its hydrochloride, obtained by dispersing the free base in water and acidifying the solution with hydrochloric acid, had a melting point of 181° C. (decomposition).

Example 2.—Preparation of 9,10-dihydro-10-(3-dimethylamino-propylidene)-9-anthrol by Method A 9 gm. (0.033 mol) of 10-(3-dimethylamino-propylidene)-anthrone were dissolved in methanol, and the solution was added dropwise to a solution of 10 gm. of sodium borohydride (0.27 mol) in 250 cc. of a mixture of equal parts of methanol and water. The mixed solution was allowed to stand overnight at room temperature. Thereafter, the methanol was distilled off in vacuo, and the precipitate formed thereby was filtered off and recrystallized from a 1:1 mixture of methanol and water. 3.6 gm. (40.5% of theory) of 9,10-dihydro-10-(3-dimethylamino-propylidene)-9-anthrol, M.P. 154–156° C., of the formula

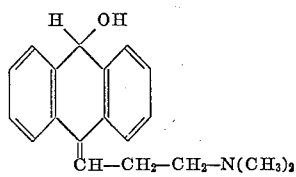

were obtained.

Example 3.—Preparation of 9,10-dihydro-10-(1-methyl-4-piperidylidene)-9-anthrol by Method A 10.15 gm. (0.0351 mol) of 10-(1-methyl-4-piperidylidene)-anthrone were dissolved in a solution of 44 gm. (0.22 mol) of aluminum isopropylate in 350 cc. of isopropanol, and the solution was heated to the boiling point in a vessel provided with a distillation column. About 100 cc. of isopropanol were distilled off in the course of eight hours. Thereafter, the remaining solution was distilled in vacuo to dryness, the residue was decomposed with water, and the aqueous mixture was extracted with chloroform. The extract solution was then dried and evaporated to dryness, and the residue was recrystallized from ethyl acetate. 9 gm. (0.031 mol or 88% of theory) of 9,10-dihydro-10-(1-methyl-4-piperidylidene)-9-anthrol, M.P. 230° C., were obtained.

Example 4

Using a procedure analogous to that described in Example 2, 2- or 3-chloro-9,10-dihydro-10-(3-dimethylamino-propylidene)-9-anthrol was obtained from 2- or 3-chloro-10-(3-dimethylamino-propylidene)-anthrone. The exact position of the chloro-substituent in the starting compound and the end product was not determined. The end product had a thin-film chromatographic R_f-value of 0.6 (silicagel, methanol/ammonia=98:2).

Example 5

Using a procedure analogous to that described in Example 1, 2,3-dichloro-9,10-dihydro-10-(3-dimethylamino-propylidene)-9-anthrol, M.P. 85–90° C., of the formula

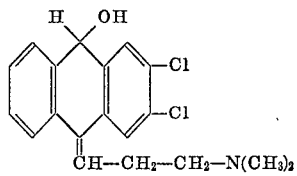

was obtained from 2,3-dichloro-10-(3-dimethylamino-propylidene)-anthrone.

Example 6

Using a procedure analogous to that described in Example 3, 2- or 3-methoxy-9,10-dihydro-10-(1-methyl-4-piperidylidene)-9-anthrol was obtained from 2- or 3-methoxy-10-(1-methyl-4-piperidylidene)-anthrone. The exact position of the methoxy-substituent in the starting compound and the end product was not determined. The end product had a melting point of 202–205° C.

Example 7

Using a procedure analogous to that described in Example 1, 2,3-dichloro-9,10-dihydro-10-(1-methyl-3-dimethylamino-propylidene)-9-anthrol, M.P. 100–110° C., of the formula

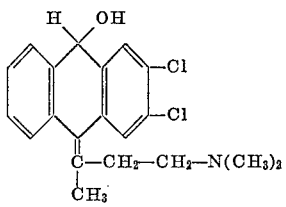

was obtained from 2,3-dichloro-10-(1-methyl-3-dimethylamino-propylidene)-anthrone.

Example 8

Using a procedure analogous to that described in Example 3, 2- or 3-methyl-9,10-dihydro-10-(1-methyl-4-piperidylidene)-9-anthrol was obtained from 2- or 3-methyl-10-(1-methyl-4-piperidylidene)-anthrone. The exact position of the methyl-substituent on the benzo-ring in the starting compound and the end product was not determined. The end product had a melting point of 183–184° C.

Example 9

Using a procedure analogous to that described in Example 3, 2,3-dimethyl-9,10-dihydro-10-(1-methyl-4-piperidylidene)-9-anthrol, M.P. 212–213° C., of the formula

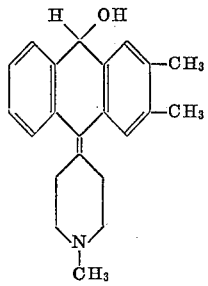

was obtained from 2,3-dimethyl-10-(1-methyl-4-piperidylidene)-anthrone.

Example 10

Using a procedure analogous to that described in Example 2, 2,3-dimethyl-9,10-dihydro-10-(3-dimethylamino-propylidene)-9-anthrol, M.P. 70–80° C., of the formula

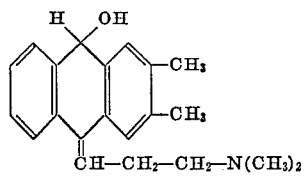

was obtained from 2,3-dimethyl-10-(3-dimethylamino-propylidene)-anthrone.

Example 11

Using a procedure analogous to that described in Example 1, 2- or 3-chloro-9,10-dihydro-10-(1-methyl-4-piperidylidene)-9-anthrol was obtained from 2- or 3-chloro-10-(1-methyl-4-piperidylidene)-anthrone. The exact position of the chloro-substituent in the starting compound and the end product was not determined. The end product had a melting point of 200–202° C.

Example 12

Using a procedure analogous to that described in Example 1, 2- or 3-chloro-9,10-dihydro-10-[(1-methyl-3-pyrrolidyl)-methylidene]-9-anthrol was obtained from 2- or 3 - chloro - 10 - [(1 - methyl - 3 - pyrrolidyl) - methylidene]-anthrone. The exact position of the chloro-substituent in the starting compound and the end product was not determined. The end product had a melting point of 115–125° C.

Example 13

Using a procedure analogous to that described in Example 1, 9,10-dihydro-10-[(1-isopropyl-3-pyrrolidyl)-methylidene]-9-anthrol, M.P. 120–130° C., of the formula

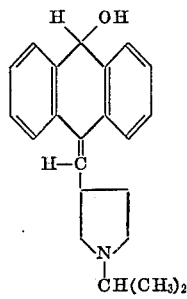

was obtained from 10-[(1-isopropyl-3-pyrrolidyl)-methylidene]-anthrone.

Example 14

Using a procedure analogous to that described in Example 2, 2- or 3-chloro-9,10-dihydro-10-[3-(1-dimethylamino)-butylidene]-9-anthrol was obtained from 2 or 3-chloro-10-[3-(1-dimethylamino) - butylidene] - anthrone. The exact position of the chloro-substituent in the starting compound and the end product was not determined. The end product had a melting point of 90–100° C.

Example 15

Using a procedure analogous to that described in Example 2, 9,10-dihydro-10-[3-(1-dimethylamino)-butylidene]-9-anthrol, M.P. 187–188° C., of the formula

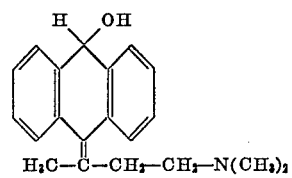

was obtained from 10-[3-(1-dimethylamino)-butylidene]-anthrone.

Example 16

Using a procedure analogous to that described in Example 3, 9,10-dihydro-10-[3-(1-methyl-piperazinyl-4)-propylidene]-9-anthrol, M.P. 170–175° C. (decomp.), of the formula

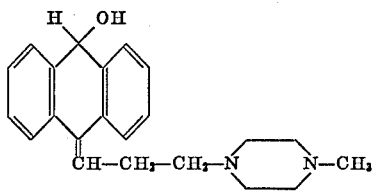

was obtained from 10-[3-(1-methyl-piperazinyl-4)-anthrone.

Example 17.—Preparation of 9,10-dihydro-9-methyl-10-(1-methyl-4-piperidylidene)-9-anthrol by method B A solution of 14.5 gm. (0.05 mol) of 10-(1-methyl-4-piperidylidene)-anthrone in 150 cc. of tetrahydrofuran was added to a solution of 0.08 mol of methyl magnesium iodide in 80 cc. of ether, and the mixed solution was refluxed for two and half hours. Thereafter, the reaction mixture was slowly decomposed with a cold aqueous ammonium chloride solution while cooling with ice. The precipitate formed thereby was collected by filtration, dried and recrystallized from chloroform. 9.25 gm. (0.03 mol or 60% of theory) of 9,10-dihydro-9-methyl-10-(1-methyl-4-piperidylidene)-9-anthrol, M.P. 300–303° C., of the formula

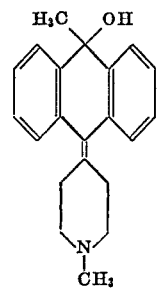

were obtained.

Example 18

Using a procedure analogous to that described in Example 17, 9,10-dihydro-9-isopropyl-10-(1-methyl-4-piperidylidene)-9-anthrol, M.P. 249–250° C., of the formula

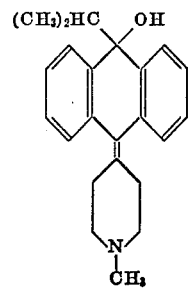

was obtained from 10-(1-methyl-4-piperidylidene)-anthrone and isopropyl magnesium bromide.

Example 19

Using a procedure analogous to that described in Example 17, 9,10-dihydro-9-phenyl-10-(1-methyl-4-piperidyl-idene)-9-anthrol, M.P. 283–284° C., of the formula

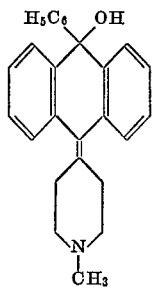

was obtained from 10-(1-methyl-4-piperidylidene)-anthrone (M.P. 171–172° C.) and phenyl magnesium bromide.

Example 20.—Preparation of a non-toxic acid addition salt 2.0 gm. of 9,10-dihydro-10-(1-methyl-4-piperidyl-idene)-9-anthrol were dissolved at 60° C. in 35 cc. of absolute tetrahydrofuran, and the resulting solution was admixed with a solution of 0.8 gm. of maleic acid in 10 cc. of absolute tetrahydrofuran. Thereafter, the mixed solution was allowed to cool, and the crystalline precipitate formed thereby was collected by filtration. 2.7 gm. of 9,10-dihydro-10-(1-methyl-4-piperidylidene)-9-anthrol hydrogenmaleate, M.P. 215° C., were obtained.

The compounds according to the present invention, that is, those embraced by Formula I above, their non-toxic, pharmacologically acceptable acid addition salts and their non-toxic quaternary ammonium salts, have useful pharmacodynamic properties. More particularly, they exhibit psychotropic, sedative, histaminolytic, antiemetic, narcosis-potentiating, adrenolytic, antipyretic, hypothermic, spasmolytic, antiphlogistic, antitussive, local anaesthetic and antichlorinergic activities in warm-blooded animals. Moreover, the compounds of the invention are very effective antitoxins against snake poison in warm-blooded animals.

For pharmaceutical purposes the compounds according to the present invention are administered topically, perorally or parenterally to warm-blooded animals as active ingredients in customary dosage unit compositions, that is, compositions in dosage unit form consisting essentially of an inert pharmaceutical carrier and one dosage unit of the active ingredient. Examples of such dosage unit compositions are tablets, coated pills, capsules, wafers, solutions, suspensions, syrups, suppositories, dusting powders, lotions, ointments, jellies and the like. One dosage unit of the compounds according to the invention is from 0.08 to 0.5 mgm./kg. body weight, and the daily dose rate is from 0.3 to 1.7 mgm./kg. body weight.

The following examples illustrate a few dosage unit compositions comprising a compound of the instant invention as an active ingredient. The parts are parts by weight unless otherwise specified.

Example 21.—Coated pills

The pill core composition is compounded from the following ingredients:

|  | Parts |
| --- | --- |
| 9,10-dihydro-10-(1-methyl - 4 - piperidylidene)-9-anthrol | 4.0 |
| Lactose | 30.5 |
| Cellulose, microcrystalline | 15.0 |
| Magnesium stearate | 0.5 |
| Total | 50.0 |

Compounding procedure.—The individual ingredients are passed through a 0.75 mm.-mesh screen, are then thoroughly admixed with each other, and the mixture is pressed into 50 mgm.-pill cores, which are subsequently coated with a thin shell consisting essentially of sugar and talcum. The pills are then polished with beeswax. Each coated pill weights approximately 90 mgm. and contains 4 mgm. of the active ingredient.

Example 22.—Tablets

The tablet composition is compounded from the following ingredients:

|  | Parts |
| --- | --- |
| 9,10-dihydro-10-(1 - methyl - 4 - piperidylidene)-9-anthrol hydrogenmaleate | 20.0 |
| Lactose | 74.0 |
| Cellulose, microcrystalline | 35.0 |
| Magnesium stearate | 1.0 |
| Total | 130.0 |

Compounding procedure.—The individual ingredients are passed through a 0.75 mm.-mesh screen, are then intimately admixed with each other, and the mixture is pressed into 130 mgm.-tablets. Each tablet contains 20 mgm. of the active ingredient.

Example 23.—Hypodermic solution

The solution is compounded from the following ingredients:

|  | Parts |
| --- | --- |
| 9,10-dihydro-10-(1 - methyl - 4 - piperidylidene)-9-anthrol hydrogenmaleate | 4.0 |
| Sodium chloride | 16.0 |
| Distilled water, q.s. ad2000.0 parts by vol. |  |

Compounding procedure.—A sufficient amount of distilled water is heated to 80° C., and the anthrol compound and the sodium chloride are dissolved therein, one after the other. The resulting solution is cooled to room temperature, diluted to the desired volume with additional distilled water, and filtered until free from suspended particles. The solution is filled into white 2 cc.-ampules which are then sterilized for 20 minutes at 120° C. and sealed. Each ampule contains 4 mgm. of the active ingredient.

Example 24.—Suppositories

The suppository composition is compounded from the following ingredients:

|  | Parts |
| --- | --- |
| 9,10-dihydro-10-(1-methyl - 4 - piperidylidene)-9-anthrol hydrogenmaleate | 25.0 |
| Cocoa butter | 1675.0 |
| Total | 1700.0 |

Compounding procedure.—The cocoa butter is melted and then cooled to 40° C. The finely pulverized anthrol compound is stirred into the warm cocoa butter with the aid of an immersion homogenizer. The mixture is then poured into cooled suppository molds, each holding 1700 mgm. of the mixture. Each suppository contains 25 mgm. of the active ingredient.

Example 25.—Aerosol spray

The spray composition is compounded from the following ingredients:

|  | Parts |
| --- | --- |
| 9,10-dihydro-10-(1-methyl - 4 - piperidylidene)-9-anthrol | 0.02 |
| Sorbitan trioleate | 0.20 |
| Trifluoro-trichloro-ethane | 3.78 |
| Mixture of monofluoro-trichloro-methane, difluoro-dichloro - methane, and tetrafluoro - dichloro-ethane, in ratio 3:3:4 | 16.00 |
| Total | 20.00 |

Compounding procedure.—The finely milled anthrol compound is intimately admixed with the sorbitan trioleate, and the mixture is combined with the trifluorotrichloro-ethane. 4 gm.-portions of the resulting mixture are filled into individual spray cans and, after attaching the aerosol spray valve, 16 gm. of the propellant gas mixture are pressed into each can. The spray released from the can by depressing the valve contains 0.1% by weight of the active ingredient.

Example 26.—Ointment

The ointment composition is compounded from the following ingredients:

| | Parts |
|---|---|
| 9,10-dihydro-10-(1-methyl - 4 - piperidylidene)-9-anthrol | 0.5 |
| Vaseline | 70.0 |
| Paraffin oil | 29.5 |
| Total | 100.0 |

Compounding procedure.—The finely milled anthrol compound is stirred into a molten mixture of the vaseline and the paraffin oil at 40° C. with the aid of an immersion homogenizer. The resulting mixture is stirred until cold. The finished ointment contains 0.5% by weight of the active ingredient.

Example 27.—Lotion

The lotion is compounded from the following ingredients:

| | Parts |
|---|---|
| 9,10-dihydro-10-(1-methyl - 4 - piperidylidene)-9-anthrol hydrogenmaleate | 0.20 |
| Citric acid | 10.13 |
| Secondary sodium phosphate·2H$_2$O | 0.37 |
| Cetyl stearyl alcohol | 2.0 |
| Isopropyl myristate | 2.0 |
| Glycerin | 3.0 |
| p-Hydroxy-benzoic acid methyl ester | 0.1 |
| p-Hydroxy-benzoic acid propyl ester | 0.05 |
| Distilled water | 92.15 |
| Total | 100.00 |

Compounding procedure.—85 parts of distilled water are heated to 80° C., and the p-hydroxy-benzoic acid esters as well as the anthrol compound are dissolved therein while stirring. The glycerin is then added to the solution (phase A).

The cetyl stearyl alcohol and the isopropyl myristate are combined, and the mixture is melted and cooled to 65° C. (phase B).

Phase B is stirred into phase A at 65° C., the resulting emulsion is cooled to 40° C., and a solution of the citric acid and the sodium phosphate in the remaining amount of distilled water is added to the emulsion. The resulting composition is stirred until cold. The finished lotion contains 0.2% by weight of the active ingredient.

Example 28.—Dusting powder

The powder is compounded from the following ingredients:

| | Parts |
|---|---|
| 9,10-dihydro-10-(1-methyl - 4 - piperidylidene)-9-anthrol | 0.2 |
| Wool grease | 2.0 |
| Isopropyl myristate | 3.0 |
| Zinc oxide | 3.0 |
| Colloidal silicic acid | 2.0 |
| Talcum | 89.8 |
| Total | 100.0 |

Compounding procedure.—The wool grease and the isopropyl myristate are combined, the mixture is melted and cooled to 70° C., and then the zinc oxide and so much talcum are stirred in until a crumbly mass is formed, which is cooled and passed through a 1 mm.-mesh screen (mixture A).

The finely powdered anthrol compound is stirred with a sufficient amount of talcum to make a mixture containing 10% by weight of the anthrol compound (mixture B).

Mixtures A and B are combined with each other and the remaining amount of talcum as well as the collidal silic acid, and the resulting composition is milled. The finished powder contains 0.2% by weight of the active ingredient.

Example 29.—Jelly

The jelly is compounded from the following ingredients:

| | Parts |
|---|---|
| 9,10-dihydro-10-(1-methyl - 4 - piperidylidene)-9-anthrol hydrogenmaleate | 0.2 |
| Polyglycolether emulsifier | 28.0 |
| Glycerin | 5.0 |
| p-Hydroxy-benzoic acid methyl ester | 0.1 |
| Distilled water | 66.7 |
| Total | 100.0 |

Compounding procedure.—The anthrol compound, the p-hydroxy-benzoic acid ester and the glycerin are dissolved in the distilled water at 85° C., and the warm molten polyglycolether is emulsified into the hot solution. The resulting gel is stirred until cold. The finished jelly contains 0.2% by weight of the active ingredient.

Example 30.—Eye drop solution

The solution is compounded from the following ingredients:

| | Parts |
|---|---|
| 9,10-dihydro-10-(1-methyl - 4 - piperidylidene)-9-anthrol hydrogenmaleate | 0.2 |
| Citric acid | 0.13 |
| Secondary sodium phosphate·2H$_2$O | 0.37 |
| Sodium chloride | 0.8 |
| Thimerosal | 0.0025 |
| Distilled water | 98.4975 |
| Total | 100.0 |

Compounding procedure.—The distilled water is heated to 80° C., and the anthrol compound, the thimerosal, the citric acid, the sodium phosphate and the sodium chloride are successively dissolved therein. The solution is then cooled to room temperature and is finally filtered until free from suspended particles. The solution contains 0.2% by weight of the active ingredient.

Example 31.—Nose drop solution

The solution is compounded from the following ingredients:

| | Parts |
|---|---|
| 9,10-dihydro-10-(1-methyl-4-piperidylidene)-9-anthrol hydrogenmaleate | 0.2 |
| Sorbitol, 70% | 2.0 |
| Citric acid | 0.13 |
| Secondary sodium phosphate·2H$_2$O | 0.37 |
| Sodium chloride | 0.5 |
| Thimerosal | 0.0025 |
| Distilled water | 96.7975 |
| Total | 100.0 |

The compounding procedure is the same as in Example 30. The solution contains 0.2% by weight of the active ingredient.

Example 32.—Drop solution for oral administration

The solution is compounded from the following ingredients:

| | Parts |
|---|---|
| 9,10-dihydro-10-(1-methyl-4-piperidylidene)-9-anthrol | 0.2 |
| Ethanol | 56.0 |
| Distilled water, q.s. ad100.0 parts by vol. | |

Compounding procedure.—The anthrol compound is dissolved in the ethanol, the solution is diluted with distilled water to the desired volume, and the aqueous solution is filtered until free from suspended particles. 1 cc. of the finished solution contains 2 mgm. of the active ingredient.

Although the preceding dosage unit composition examples illustrate only two of the compounds according to the present invention as active ingredients, it should be understood that any other compound embraced by Formula I, a non-toxic, pharmacologically acid addition salt thereof or a non-toxic quaternary ammonium salt thereof, may be substituted for the illustrated compound in Examples 21 to 32. Moreover, the illustrated active ingredient content may be varied to provide the above indicated dosage unit range, and the amounts and nature of the inert ingredients may be varied to meet particular requirements.

While the present invention has been illustrated with the aid of certain specific embodiments thereof, it will be readily apparent to others skilled in the art that the instant invention is not limited to these particular embodiments, and that various changes and modifications may be made without departing from the spirit of the invention or the scope of the appended claims.

We claim:
1. A compound of the formula

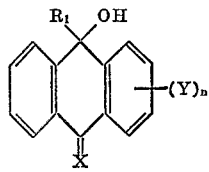

wherein
$R_1$ is hydrogen, lower alkyl or phenyl,
X is (N-lower alkyl-pyrrolidyl)-methylidene or N-lower alkyl-piperidylidene,
Y is methyl, chlorine, bromine or methoxy, and
$n$ is an integer from 0 to 2, inclusive, or a non-toxic, pharmacologically acceptable acid addition salt thereof.

2. 9,10 - dihydro - 9 - phenyl - 10 - (1 - methyl - 4 - piperidylidene)-9-anthrol.

3. 2- or 3-chloro-9,10-dihydro-10-(1-methyl-4-piperidylidene)-9-anthrol.

4. 9,10 - dihydro - 9 - methyl - 10 - (1 - methyl - 4 - piperidylidene)-9-anthrol.

5. 9,10 - dihydro - 9 - isopropyl - 10 - (1 - methyl - 4 - piperidylidene)-9-anthrol.

6. 9,10 - dihydro - 10 - (1 - methyl - 4 - piperidylidene)-9-anthrol.

References Cited

UNITED STATES PATENTS

| 1,915,334 | 6/1933 | Salzberg et al. | 260—243 |
| 2,075,359 | 3/1937 | Salzberg et al. | 167—22 |
| 3,234,279 | 2/1966 | Kollonitsch et al. | |
| 3,337,623 | 8/1967 | Engelhardt et al. | |

FOREIGN PATENTS

| 1,345,936 | 11/1963 | France. |

HENRY R. JILES, Primary Examiner

S. D. WINTERS, Assistant Examiner

U.S. Cl. X.R.

260—240, 253, 268, 293.4, 294, 326.5, 351; 424—267, 274